United States Patent [19]

Ewers

[11] 4,239,248
[45] Dec. 16, 1980

[54] COLLAPSIBLE WALKER

[76] Inventor: Marion H. Ewers, 306 S. Broadway, Marlow, Okla. 73055

[21] Appl. No.: 949,916

[22] Filed: Oct. 10, 1978

[51] Int. Cl.³ .............................................. B62M 1/00
[52] U.S. Cl. ..................................... 280/42; 272/70.3; 280/87.02 R; 280/87.05; 280/270; 280/287; 297/5
[58] Field of Search ................ 280/87.02 W, 87.02 R, 280/87.05, 7.1, 639, 638, 287, 38, 42, 270; 272/70.3, 70, 70.4; 297/5, 6

[56] References Cited

U.S. PATENT DOCUMENTS

| | | | |
|---|---|---|---|
| 357,249 | 2/1887 | Valiquet | 280/270 X |
| 1,404,274 | 1/1922 | Cooper | 280/87.02 R |
| 2,774,605 | 12/1956 | Schladebach | 280/38 |
| 2,896,693 | 7/1959 | Schladebach | 280/42 |
| 3,059,943 | 10/1962 | Rich | 280/87.02 R |
| 3,488,088 | 1/1970 | Goldberg et al. | 297/5 |
| 3,992,024 | 11/1976 | Workman | 280/87.02 W |
| 4,065,145 | 12/1977 | Chambers | 280/87.02 R |

*Primary Examiner*—John J. Love
*Assistant Examiner*—Milton L. Smith
*Attorney, Agent, or Firm*—Charles E. Cates

[57] ABSTRACT

A three-wheeled vehicle has three major frame components: the first two being spaced parallel bars disposed horizontally relative to the ground; the second being two bars hingedly connected to the first bars at an angle thereto and approaching each other at their second ends; the third being a third bar to which the second bars are hingedly attached intermediate the ends of the third bar. The first wheel pair supports the first frame member and the second steerable wheel supports the third frame member at one end. The other end of the third frame member carries a seat which is supported between the spaced bars of the first frame member. The seat is adjustable and the height of the frame components is also adjustable. The second wheel means is remotely controlled by hand controls provided at convenient locations on the first frame member. The first, second and third frame components may be locked in place for use and the walker may be collapsed in and upon itself for storage and transportation.

7 Claims, 7 Drawing Figures

COLLAPSIBLE WALKER

BACKGROUND OF THE INVENTION

This invention relates to a collapsible vehicle of the kind used by persons who need support while walking or re-learning walking, whether by reason of disease, infirmity of advanced years, or other causes.

There has always been a need for mechanical assistance for persons suffering with the afflictions described which has been met in various ways. One of the responses presenting a similar device offered to meet the problem is the three-wheeled vehicle such as shown in the patent to Schladebach, U.S. Pat. No. 2,774,605. The Schladebach device provides for the seating of the patient and the propelling of the vehicle by hand manipulation of two front wheels.

The Schladebach device can be collapsed upon itself, but the vehicle must be partially taken apart with tools in order to do so. It also involves the storage of the part that is detached from the main part of the vehicle together with associated nuts and bolts while the vehicle is being transported.

Moreover, the wheels must swing around a pivot point and fold up against the front wheel to achieve any degree of compactness. The operation requires a large area in which the wheel member can be pivoted and necessitates the lifting of the wheel in order to permit it to pivot.

There has existed a need for a vehicle which can be folded upon itself in a relatively narrow space without the necessity of lifting any part of the vehicle; which will provide the patient with support while walking and means for resting from time to time when walking becomes tiring; which is easy to gain access to, adjustable as to height, stores compactly and is adjustable to varying angles to accommodate the problems presented by some narrower than ordinary doors encountered in a good many homes and other places.

BRIEF DESCRIPTION OF THE INVENTION

I have provided an invention which meets the felt needs of the patient for a vehicle having the characteristics above described. I have provided a three-wheel walker which comprises two spaced approximately parallel first bars which are disposed horizontally relative to ground level; two second bars each hingedly connected at one end to said first bars for horizontal movement; and a third bar to which the other ends of the second bars are hingedly connected for horizontal movement intermediate the ends of the third bar. I provide means for retaining the second bars at a selected angle to the first bars with the other ends of the second bars approaching each other; and the third bar at a selected angle to the second bars and all horizontal to ground level.

The walker has seat means which may be, conveniently, a bicycle seat, particularly of the banana seat type that when slightly tilted provides easy access to the user. The seat is carried by a first end of the third bar and is disposed about midway between the spaced first bars.

First wheel means are attached to the first bars to provide support for the bars which in a preferred embodiment are at the front end of the vehicle. These wheels do not rotate about a vertical axis or otherwise provide means for steering. However, second wheel means are steerably attached to the second end of the third bar and support the walker at this third point. This second wheel is rotatable about a vertical axis and is used for steering by means of a remote control system which will be explained presently. Lastly, detent means for locking the first, second and third bars into fixed operating position relative each other are provided.

The remote control means which has been alluded to may conveniently be a lever pivotally attached intermediate its ends to a first frame bar at a site convenient to the reach of the user. One end may carry a suitable handle means for grasping. Equidistant from the pivot point on the lever two wires are attached which lead to a cross which is pivotally disposed at the juncture of a first bar and second bar. The set of wires go to the opposite ends of one of the arms of the cross. A second set of wires leads from the opposite ends of the second arm of the cross to the opposite ends of a first arm of a second cross which is pivotally disposed at the juncture of a second and the third bar. A third set of wires attached to the opposite ends of the second arm of the second cross leads to the opposite ends of a T-member integrally attached to the steering post of the second wheel member of the steering wheel, such that when the control lever is moved backward and forward by the user this motion is translated into rotary movement in the steering column by means of the crosses and wires which lead to the T-member on the steering column. Thus, the wheel may be turned left or right to guide the vehicle. Preferably, like control means are provided on either side of the vehicle so that the wheel may be steered or controlled by either the right or left hand or both.

The detent means conveniently takes the form of an arm attached to one of the bars at its juncture with another bar and extending along the other bar where it may be secured in any convenient way, such as, for example, by dropping a pin through registering slots in the arm and the other bar.

Means for adjusting the seat height are provided which may be the means normally used in adjusting the height of a bicycle seat.

Also, means are provided for adjusting the height of the walker which, conveniently, may take the form of telescoping standards attaching to the wheel forks and the first and third bars. The telescoping member will carry stops which permit adjustment to varying degrees of telescoping.

DETAILED DESCRIPTION OF THE PREFERRED EMBODIMENT

A more complete understanding of the invention will be gained by consulting the drawings appended hereto in which.

Figure 1:
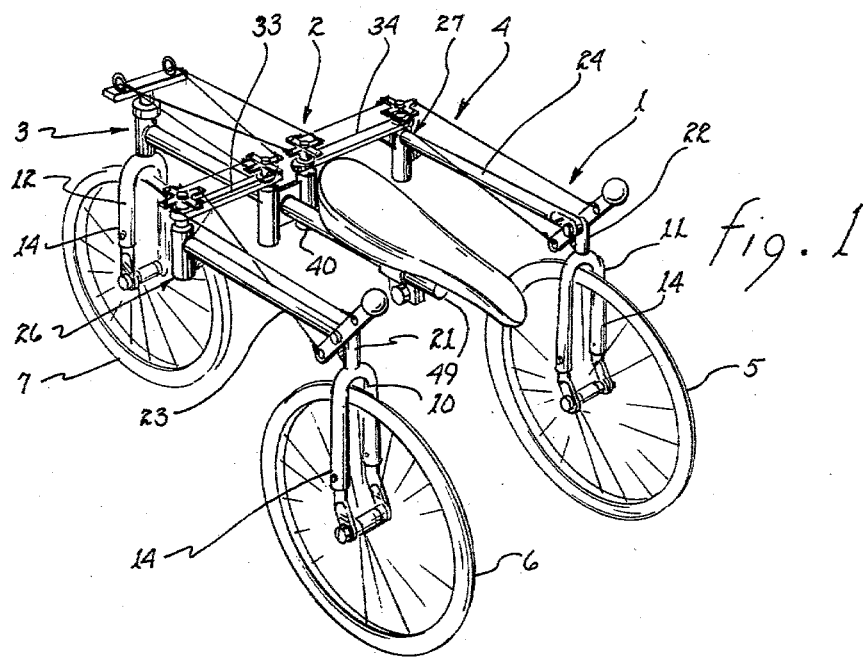
FIG. 1 is a perspective view of a preferred embodiment of the invention.
Figure 2:
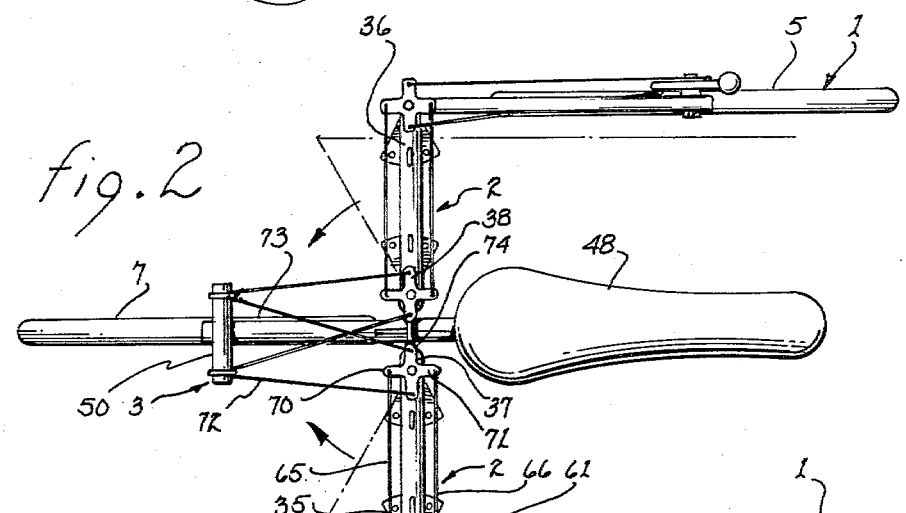
FIG. 2 is a plan view of the walker of FIG. 1.

Turning now specifically to FIG. 1, it can be seen that the walker has three major frame components, indicated generally by arrows, 1, 2 and 3, that are hingedly connected together to enable reduction to compact size for storage and transport. The walker 4 is supported by front wheels 5 and 6 and rear wheel 7. These wheels are ordinary bicycle wheels and no further detailed description of the wheel components need be made.

Figure 7:
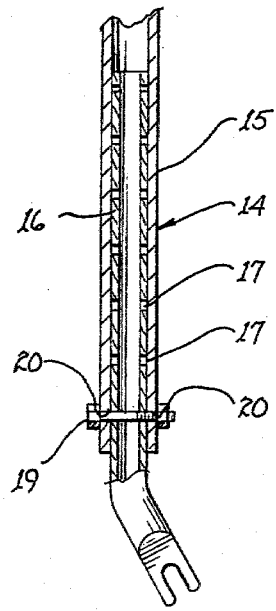
FIG. 7 is a view in section of a portion of the wheel forks of the preferred embodiment shown in FIGS. 2 and 3.

The front wheels support the first major frame component by means of wheel forks 10 and 11. The third major frame component is supported by means of wheel fork 12. In this embodiment all three forks are specially constructed with telescoping legs 14 as best seen in FIG. 7, wherein an outer sleeve 15 fits over an inner standard 16. The inner standard 16 is provided with a plurality of apertures 17 adapted to receive a bolt 19. The outer sleeve 15 carries one set of apertures 20 which when made to register with one of the inner standard apertures will receive the bolt 19. In this fashion the height of the walker can be adapted to fit individual needs of users.

A vertical leg 21, 22 arises from each of the wheel forks 10 and 11 and turns the corner to form horizontal legs 23, 24 that terminate at pivot post assemblies 26, 27 to which horizontal legs 23, 24 are attached. Pivot post assemblies are constructed as best seen in the enlarged view of FIG. 4 with a vertical pipe 28 in which is inserted a pin 29 having a retaining flange 30 at its lower end and a cross 31 disposed at its upper end. The function of the cross will be detailed at a latter section of this explication.

Figure 4:
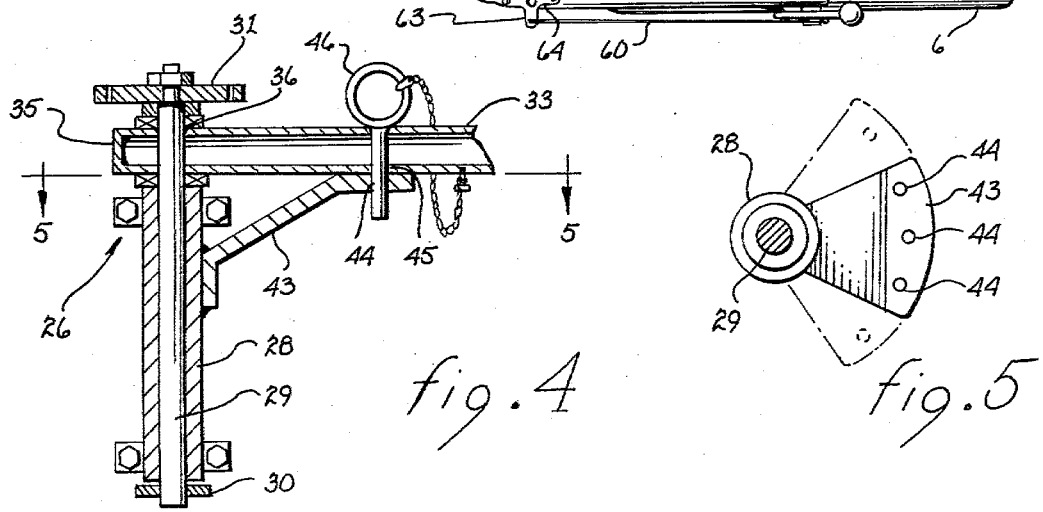
FIG. 4 is a view in section of a fragment of the device shown in FIG. 3, along the lines 4—4.

The second major frame component comprises two bars 33, 34 each pivotally connected at one end 35 to make a hinge as seen in FIG. 4 wherein the hole 36 which receives the pin 29 is shown. The other ends 37, 38 of the bars 32, 33 are hingedly connected to bar 40 which is part of the third frame component. The same type of pivot post assembly is provided in connection with bar 40 as is provided for horizontal legs 23, 24 of the first major frame component.

Figure 5:
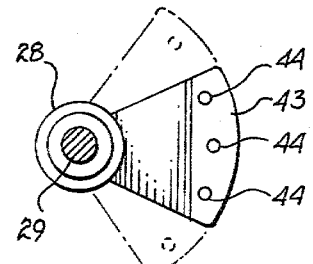
FIG. 5 is a fragmentary view of the device of FIG. 4, along the lines 5—5.

Detent means are provided to retain the three major frame components in the desired attitude of angle and distance from each other. As best seen in FIGS. 4 and 5 the detent means is made of an arm 43 which is welded to pipe 28 and provided with a bore 44 which registers with a similar bore 45 in bar 33 to receive pin 46. Arm 43 is provided with a plurality of bores 44 so that the angle of the major frame components relative each other can be varied by registering different ones of the bores 44 with the bore 45 and inserting the pin 46.

A seat 48 is provided for the user to rest upon if he grows weary of walking. This is a common bicycle seat which is adjustably retained on a first end 49 of bar 40 by means of a conventional clamp arrangement. Referring to FIG. 1, if a person were illustrated standing or seated in operating position at the controls of the walker, the person would be facing the viewer.

Figure 3:
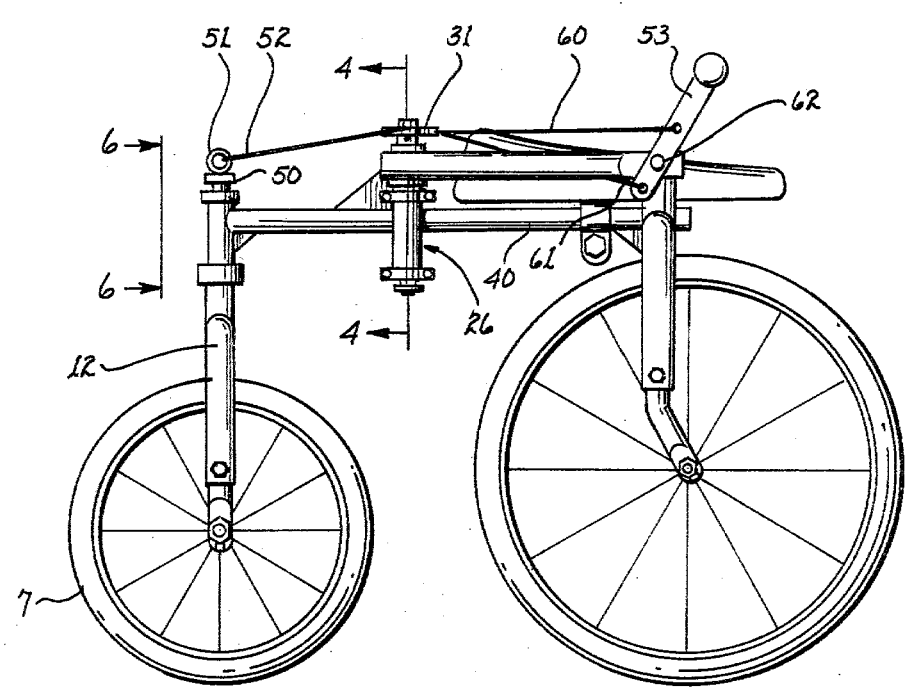
FIG. 3 is a side elevation view of the walker of FIGS. 1 and 2.
Figure 6:
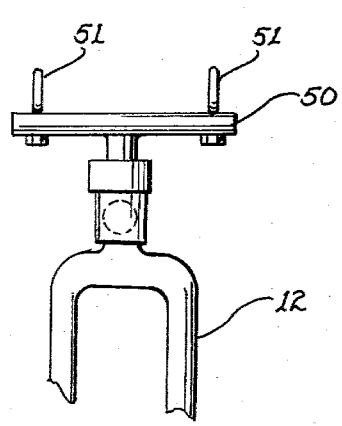
FIG. 6 is a view of a portion of the walker as shown in FIG. 3, taken along the directions indicated by lines 6—6.

Turning now to a consideration of the steering mechanism of the walker, attention is called to FIG. 3. Starting with the wheel 7 which is the control wheel, it is seen that in the steering post an ordinary bicycle mechanism used for rotating the wheel is used; except that instead of a handle bar a T-bar 50 constructed in a special manner is used. The T-bar is fitted with eye bolts 51 at either end. Wires 52 attached to the T-bar control it as will be explained.

At the front end convenient to the operator are levers 53, 54 joined to horizontal legs 23, 24. The operation of both levers are identical and will be explained with reference to one only for convenience, the significance being that operation may be left handed, right handed or both.

Two wires 60, 61 are attached at one end to lever 53(54) equidistant from a pivot point 62 and at the other end to opposite ends of arm 63 of cross 64. Wires, 65, 66 are attached to opposite ends of arm 67 of cross 64 and communicate with and attach to arm 70 of cross 71. Wires, 72, 73 attach to arm 74 of cross 71 and connect to opposite ends of T-bar 50. Thus, in operation the lever 53 when pushed and pulled by the operator translates through the wires and crosses 64, 71 which are rotatable to turn the T-bar and the steering wheel. The same result follows in the other side of the control systems by similar operation.

I claim:

1. A three-wheeled walker comprising:
   (a) a frame comprising two spaced approximately parallel first bars disposed horizontally relative to ground level; two second bars each hingedly connected at one end to said first bars for horizontal movement, the other ends of said second bars approaching each other; a third bar to which said other ends of said second bars are hingedly connected for horizontal movement intermediate the ends of said third bar;
   (b) seat means carried by a first end of said third bar between said spaced first bars;
   (c) first wheel means attached to said first bars in supporting relationship;
   (d) second wheel means steerably attached to the second end of said third bar in supporting relationship thereto;
   (e) remote control means adapted to steer said second wheel means;
   (f) detent means for releasably locking said first, second and third bars into a fixed operative position relative to each other;
   whereby said walker may be folded for transportation and storage and unfolded and locked into place for use.

2. The walker of claim 1 wherein said remote control means comprises at least one lever carried by said first bars at a place convenient to the user and attached at a pivot point intermediate the ends of said lever; spaced control wires attached to said lever equidistant from said pivot point, and means for operably translating the rotary motion of said lever to control said second wheel means.

3. The walker of claim 2 wherein said means for translating the motion of the lever to control said wheels comprises crosses rotatably attached to the frames at the junctures of first and second bars and second and third bars; said control wires being attached to the ends of one arm of at least one first cross between first and second bars, second wires communicating between the second arm of said first cross and the first arm of at least one second cross between second and third bars, a third set of wires communicating between the second arm of said second cross and a control bar attached to the steering column of said second wheel means.

4. The walker of claim 1 wherein said detent means comprises an arm releasably connecting one frame to another frame.

5. The walker of claim 1 with the addition of means for varying the height of the standards supporting said first bars on said first wheel means and said third bar on said second wheel means.

6. The walker of claim 1 wherein said angle of said first bars and second bars to each other and said angle of said second bars and third bars to each other is each approximately ninety degrees.

7. The walker of claim 1 wherein said detent means for locking said first and second and second and third bars into place has a plurality of stop positions whereby the angle can be adjusted to provide varying distances between and varying angles of attachment to the spaced first bars.

* * * * *